United States Patent

Satake et al.

[11] Patent Number: 6,096,455
[45] Date of Patent: Aug. 1, 2000

[54] PLATE-LIKE CURRENT COLLECTOR AND METHOD OF PRODUCING THE SAME

[75] Inventors: Susumu Satake, Kawnishi; Koichi Ashizawa; Kazuo Tahara, both of Suita, all of Japan

[73] Assignees: Nippon Seihaku Kabushiki Kaisha; Nippaku Sangyo Kabushiki Kaisha, both of Osaka, Japan

[21] Appl. No.: 09/176,108

[22] Filed: Oct. 21, 1998

[30] Foreign Application Priority Data

Oct. 22, 1997 [JP] Japan ...................................... 9-309205
May 15, 1998 [JP] Japan ..................................... 10-151967

[51] Int. Cl.$^7$ ...................................................... H01M 4/70
[52] U.S. Cl. ........................ 429/241; 429/243; 429/244; 29/2; 29/623.1
[58] Field of Search ..................................... 429/241, 243, 429/244; 29/2, 623.1; 427/126.3

[56] References Cited

U.S. PATENT DOCUMENTS

| | | | |
|---|---|---|---|
| 1,752,963 | 4/1930 | Pettinelli | 429/241 |
| 2,088,596 | 8/1937 | Haunz | 429/241 |
| 5,498,496 | 3/1996 | Sasaki | 429/233 |
| 5,543,250 | 8/1996 | Yanagihara | 429/241 |
| 5,578,398 | 11/1996 | Jenkins | 429/233 |
| 5,849,430 | 12/1998 | Lee | 429/94 |
| 5,949,637 | 9/1999 | Iwaida | 361/502 |

*Primary Examiner*—Maria Nuzzolillo
*Assistant Examiner*—Mark Ruthkosky
*Attorney, Agent, or Firm*—Ronald E. Greigg; Edwin E. Greigg

[57] ABSTRACT

A plate-like current collector and the method of producing the same, said collector comprising a metal foil having a plurality of bowl-like projections, each projection projecting downwardly from the front side thereof to the reverse side thereof and having a penetrated hole in the center of the projection, a turning peripheral portion of the central penetrated hole formed to curve upwardly to a level positioning beneath the front side of the metal foil, wherein the penetrated hole may be enlarged or contracted using the elastic deformation of the turning peripheral portion.

4 Claims, 7 Drawing Sheets

6,096,455

PLATE-LIKE CURRENT COLLECTOR AND METHOD OF PRODUCING THE SAME

BACKGROUND OF THE INVENTION (1) Field of the Invention

The present invention relates to a current collector and a method of producing the same, which collector is used for a battery, particularly for a secondary battery such as a lithium secondary battery, lithium-ion battery or polyer battery.

(2) Prior Art

A secondary battery comprises an anode plate, in which an anode Material is applied onto the front and reverse sides of a collector so as to be integrated, and a cathode plate, in which a cathode material is applied onto the front and reverse sides of a collector, a sheet-like separator, which is made of a porous material, for electrically insulating the anode plate and the cathode plate. The anode plate and the cathode plate are put on one another to place the separator therebetween to be a middle layer and these elements are rolled and placed in a receptacle and an electrolyte is absorbed by the separator and thereafter the receptacle is sealed.

Conventionally, the anode plate and the cathode plate (These are called "electrode plate" hereinafter.) are produced by coating a mixed slurry including such as a solvent, and a binder with the both sides of various metal foils for integrating the metal foil with an active material, and then dried or hardened with ultraviolet rays.

In the method of producing the hole plate, it is poor in integrality of the metal foil and the active material, and therefore, as mentioned above, when rolling the electrode plate to place it in a receptacle, it somtimes happens that the metal foil and the active material are separated or peels off each other due to bending deformation of of rolling the same, and as a result, it is difficult to obtain a secondary battery having a desired capacity.

Further, when placing the electrode plate in the receptacle, since the electrode plate is placed in the receptacle in such a state that the electrode plate is deformed with bending force, as mentioned above, the metal foil and the active material of the electrode plate are peeled off gradually due to shock in using the same and as a result it has a problem that a charge-discharge capacity of the secondary battery goes down gradually.

Therefore, a plurality of holes penetrate the metal foil and the active material, which is placed on or laminated with the front and reverse sides of the metal foil, so as to be connected with each other through the penetrated holes, and thereby connection of the active materials of the front and reverse sides and the metal foil may be improved so that it may prevent the active materials from peeling off from the surface of the metal foil.

As mentioned above, to connect the active materials placed or laminated on the front and reverse sides of the metal foil by connecting to each other through the penetrated holes of the metal foil, it is necessary to punch the metal foil to have a plurality of penetrated holes in advance and to coat a side of the penetrated metal foil with a mixed slurry including the active material and another side thereof in the same manner and thereafter the mixed slurry is dried or hardened.

However, since the metal foil is penetrated, the mixed slurry coated with a side of the metal foil, goes into the other side of the metal foil through the penetrated holes and therefore the other side is stained. In this case, when coating the other side of the metal foil with the mixed slurry, it sometimes occurrs lack of uniformity in thickness of the mixed slurry on the other side and as the result it occurrs lack of uniformity of thickness of the active material. Therefore, it has a problem that it is difficult to produce the qualified electrode plate constantly.

SUMMARY OF THE INVENTION

The present invention has an object to provide a plate-current collector and a method of producing the same, which may prevent an active material placed or laminated on front and reverse sides of a metal foil from peeling off. Further, according to the present invention, when producing the electrode plate (as defined hereinbefore) by laminating the active material on the front and reverse sides, a mixed slurry including the active material coated with one side of the metal foil, does not go into the other side of the metal foil so that it may prevent an occurrence of lack of uniformity in thickness of the active material laminated on the front and reverse sides thereof, and that it may laminate and connect the active material on the front side with the active material on the reverse side of the metal foil stabily.

To achieve the object, the plate-like current collector according to claim 1 of the present invention comprises a metal foil having a plurality of bowl-like projections; each projection projecting downwardly from the front side thereof to the reverse side thereof and having a penetrated hole in the center of the projection, and a turning peripheral portion of the central penetrated hole formed to curve upwardly to a level positioning beneath the front side of the metal foil, wherein the penetrated hole may be enlarged or contracted using the elastic deformation of the turning peripheral portion.

The plate-like current collector, as claimed in claim 2 with definition of claim 1, is characterized in that the turning peripheral portion is divided by slits formed radially from the penetrated hole to make a plurality of turning peripheral lips which may be deformed elastically in up and down directions.

Further, the method of producing the plate-like current collector according to the present invention comprises the steps of supplying continuously a long belt-like metal foil between a pin roll, the periphery of which a plurality of punching pins are provided, and a back-up roll contacting the pin roll under pressure, forming a plurality of penetrated holes by means of the punching pins of the pin roll with the metal foil, and bowl-like projections; the peripheray of each bowl-like projection being projected downwardly, and forming a turning peripheral portion formed to make the peripheral portion of each of the penetrated holes to project upwardly at the time of withdrawal of the punching pins.

Furthermore, the method of producing the plate-like current collector as claimed in claim 4, comprises the steps of supplying continuously a long belt-like metal foil between a pin roll, the periphery of which a plurality of punching pins are provided, and a back-up roll contacting the pin roll under pressure, forming a plurality of penetrated holes by means of the punching pins of the pin roll with the metal foil, and bowl-like projections; the peripheray of each bowl-like projection being projected downwardly, forming a turning peripheral portion formed to make the peripheral portion of each of the piercing holes to project upwardly at the time of withdrawal of the punching pins, and then supplying the punched metal foil to press roll means, which are positioned forwardly of the said steps, and pressing the metal foil from the both sides thereof so as to correct each of upper ends of the turning peripheral portion of the penetrated hole to be positioned beneath an opening or hole end of the bowl-like projection.

Functions

When producing the electrode plate (This term is defined hereinbefore.) for the battery by using the plate-like current collector, first, the plate-like current collector is placed on a surface of a supporter in such a state that the reverse side of the collector is faced downwards. As the result, the lower ends of the turning peripheral portion of each of the bowl-like projections contact the surface of the supporter and then the elastic turning peripheral portions become in a state that they stand upwards.

In the state, the mixed slurry of high viscosity including an active material and a binder, is coated with the front side of the plate-like current collector. At the time, a coating pressure is added from the front side to the reverse side of the plate-like current collector as the mixed slurry is coating. With the coating pressure, the elastic turning peripheral portions, which stand upwards, are pressed downwards and the elastic turning peripheral portions may incline elastically in a direction that fine penetrated holes are closed to squeeze each of the diameters of opening portions of the penetrated holes while each of the lower ends of the turning peripheral portions becomes a fulcrum.

As mentioned above, since the opening portions of the penetrated holes are squeezed when coating the mixed slurry, it does not happen that the mixed slurry of high viscosity, which is coated with the front side of the plate-like current collector, goes into the reverse side through the penetrated holes. When a coating process is finised, the coating pressure against the plate-like current collector is released and the elastic turning peripheral portions return their original positions while enlarging the penetrated holes with their elasticity. However, due to high viscosity of the mixed slurry and release of the coating pressure, the mixed slurry does not go into the reverse side of the plate-like current collector through the penetrated holes after coating.

Thereafter, the mixed slurry, which is coated with the front side of the plate-like current collector, is dried or hardened with ultraviolet rays and then the active material is laminated and integrated with the surface of the plate-like current collector.

Next, the active material is laminated and integrated with the reverse side of the plate-like current collector. At the time, the plate-like current collector, which has the active material on the front side, is placed on the supporting surface of a supporter by facing the layer of the active material downtowards. When the plate-like current collector is placed on the supporting surface, the layer of the active material, which is laminated on the front surface of the plate-like current collector, becomes in a state of contacting with the supporting surface wholly, and the front side of the plate-like current collector becomes in a state that it is supported wholly on the front side of the layer of the active material.

In this state, the mixed slurry of high viscosity including the active material and the binder, is coated with the reverse side of the plate-like current collector. At the time, since the surface of the plate-like current collector is received wholly by the layer of the active material, when a coating pressure is added to the collector, as mentioned above, the elastic turning peripheral portion of each of the penetrated holes does not inclined inwards and the opening portion of the penetrated hole maintains its opening state.

Accordingly, the mixed slurry, which is coated with the reverse side of the plate-like current collector, is coated with whole of the reverse side of the plate-like current collector and then goes into the front side of the plate-like current collector through the penetrated hole, which keeps its opening state, so that the active material laminated on the front side of the collector may be connected to and integrated with the mixed slurry.

The above description is about a case that the mixed slurry is, first, coated with the front surface of the plate-like current collector so as to laminate the layer of the active material on the front side thereof. Next, it will be explained about such a case that the mixed slurry is, first, coated with the reverse side of the plate-like current collector so as to laminate and integrate the active material with the collector.

First, the plate-like current collector is placed on the supporting surface of the supporter in such a state that the front side of the collector faces downwards so as to contact the front side of the metal foil with the supporting surface. In the state that the plate-like current collector is placed on the supporting surface, the outet surface of the bottom of the bowl-like projection faces upwards, and the elastic turning peripheral portion projects downwards and the tip of the turning peripheral portion is positioned to locate a predetermined distance leaving from the supporting surface. Thus, a predetermined hight of clearance is formed between the tip of the elastic turning peripheral portion and the supporting surface.

In this state, as the mixed slurry of high viscosity, which includes the active material and the binder, is coated with the reverse side of the plate-like current collector, a coating pressure is added to the plate-like current collector from the reverse side thereof to the front side according to its coating process, the bowl-like projection is pressed from the upper part to the lower part. As the result, due to the coating pressure, the bowl-like projection elastically bend and deform from the upper part to the lower part as the lower end opening edge of the penetrated hole becomes a fulcrum. According to deform of the bowl-like projection towards the lower part, the elastic turning peripheral portion, which is formed the perihery of the penetrated hole punched in the bowl-like projection, deforms or shifts from the outside to the inside, namely, in the direction of closing the penetrated hole, so as to squeeze the opening of the penetrated hole.

As mentioned above, when coating the mixed slurry, since the opening portion of the penetrated hole is squeezed, the mixed slurry, which is coated with the reverse side of the plate-like current collector, never go into the front side thereof through the penetrated hole. When coating is finished, the coating pressure against the plate-like current collector is released and the bowl-like projection enlarges the opening of the penetrated hole and returns to its original position with its elastisity. However, the mixed slurry never go into the front side of the plate-like current collector through the penetrated hole since the mixed slurry has a high viscosity and the coating pressure is no longer urged.

Thereafter, the mixed slurry coated with the reverse side of the plate-like current collector, is dried or hardened with ultraviolet rays so as to laminate and integrate the active material with the reverse side of the plate-like current collector.

In succession, the active material is laminated and integrated with the front side of the plate-like current collector. In this case, the plate-like current collector, which is laminated and integrated with the active material with its reverse side, is placed on the supporting surface of the supporter in such a state that the active material faces downwards, in the same manner as mentioned above. In the state that the plate-like current collector is placed on the supporting surface, the layer of the active material, which is laminated on the reverse side of the plate-like current collector, becomes in a state of contacting with the supporting surface wholly, and the reverse side of the plate-like current collector becomes in a state that it is supported wholly on the surface of the layer of the active material.

Next, in the same manner as mentioned above, the mixed slurry including the active material and the binder, is coated with the front side of the plate-like current collector. At the time, the active material is laminated and integrated with the reverse side of the plate-like current collector. At the time, since the reverse side of the plate-like current collector is received wholly by the layer of the active material, when the coating pressure is added thereto, the bowl-like projection is not bent downwards and therefore the opening portion of the penetrated hole maintains its opening state.

Accordingly, the mixed slurry, which will be coated with the front side of the plate-like current collector, may be coated with the front side thereof wholly and goes into the reverse side of the plate-like current collector so as to connect and integrated with the active material laminated on the reverse side.

Advantages

The plate-like current collector according to the present invention comprises a metal foil having a plurality of bowl-like projections; each projection projecting downwardly from the front side thereof to the reverse side thereof and having a penetrated hole in the center of the projection, and a turning peripheral portion of the central penetrated hole formed to curve upwardly to a level positioning beneath the front side of the metal foil, wherein the penetrated hole may be enlarged or contracted using the elastic deformation of the turning peripheral portion.

In either case that the mixed slurry including the active material is coated with the front side or the reverse side of the plate-like current collector, the elastic turning peripheral portion of the penetrated hole or whole of the bowl-like projection may incline and bend elastically under the coating pressure so as to squeeze the penetrated hole.

Therefore, the mixed slurry coated with the fornt or reverse side of the plate-like current collector, never go into the other side and when the mixed slurry is coated with whole of a side of the plate-like current collector, it may be evaded that another side of the plate-like current collector is soiled unexpectedly with the mixed slurry which is conated a side of the plate-like current collector. Accordingly, when coating the other side of the plate-like current collector with the mixed slurry, it may prevents to occur uniformity of thickness of the coat due to unexpected adhesion of the mixed slurry to the other side. As the result, it may obtain the electrode plate having the front and reverse sides, which are laminated with the active material in a thickness in high precision.

In addition, according to the plate-like current collector, the active material layer is never peeled off from the plate-like current collector since the active material layers laminated on the front and reverse sides threof, is connected to each other through the penetrated hole.

Further, where the turning peripheral portion is divided into plural portions by the slits which are formed radially from the penetrated hole, as the coating pressure is added to the turning peripheral portion, the divided turning peripheral portions independently tend to incline elastically with the lower ends thereof as a fulcrum. Therefore, the divided turning peripheral portions smoothly incline in a direction to squeeze the penetrated hole of the bowl-like projection with the coating pressure, and as a result, when coating the front side of the plate-like current collector with the mixed slurry, it may surely prevent the mixed slurry from going into the reverse side through the penetrated hole.

Furthermore, where the bowl-like projection including the turning peripheral portion is divided into plural portions with the slits which reach the upper opening edge of the bowl-like projection, the bowl-like projections may be bent in a direction to smoothly squeeze the penetrated hole in the center of the bottom thereof, since the divided bowl-like projections are in such a state that the bowl-like projection may be bent elastically with the opening edge as a fulcrum. As the result, when the reverse side of the plate-like current collector is coated with the mixed slurry, it may surely prevent the mixed slurry from going into the fornt side of the plate-like current collector through the penetrated hole.

Finally, according to the method of producing a plate-like current collector which comprises the steps of supplying continuously a long belt-like metal foil between a pin roll, the periphery of which a plurality of punching pins are provided, and a back-up roll contacting the pin roll under pressure, forming a plurality of penetrated holes by means of the punching pins of the pin roll with the metal foil, and bowl-like projections; the peripheray of each bowl-like projection being projected downwardly, forming a turning peripheral portion formed to make the peripheral portion of each of the penetrated holes to project upwardly at the time of withdrawal of the punching pins, and then supplying the punched metal foil to press roll means, which are positioned forwardly of the said steps, and pressing the metal foil from the both sides thereof so as to correct each of upper ends of the turning peripheral portion of the penetrated hole to be positioned beneath an opening or hole end of the bowl-like projection, it becomes possible to improve an efficiency of productivity of the plate-like current collector by continously forming a number of the bowl-like projections of predetermined figure with a long belt-like metal foil. In addition, since the penetrated holes are formed with the metal foil by means of the punching pins in such a state that the metal foil is pressed with the facing outer surface of each of the pin roll and the backup roll, which are contacted to each other under pressure, the punching pins may penetrate the metal foil with their bottom portions and as the result, the bowl-like projections each having substantially the same diameter, may be formed with the metal foil accoding to a predetermined pattern.

BRIEF DESCRIPTION OF THE DRAWINGS

The drawings show embodiments of the present invention in which.

DETAILED DESCRIPTION OF THE PREFERRED EMBODIMENTS

An example of a plate-like current collector according to the present invention will be described with reference to the drawings.

Figure 1:
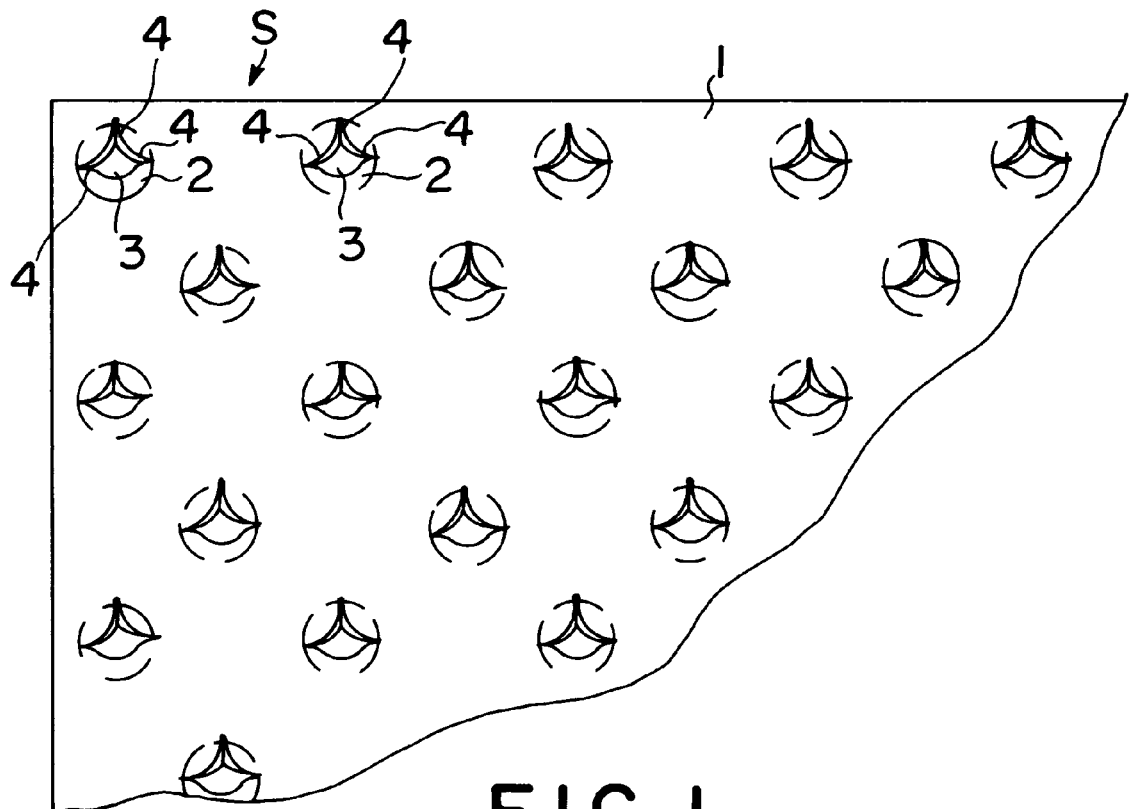
FIG. 1 is a perspective view showing a part of a plate-like current collector of this invention.
Figure 2:
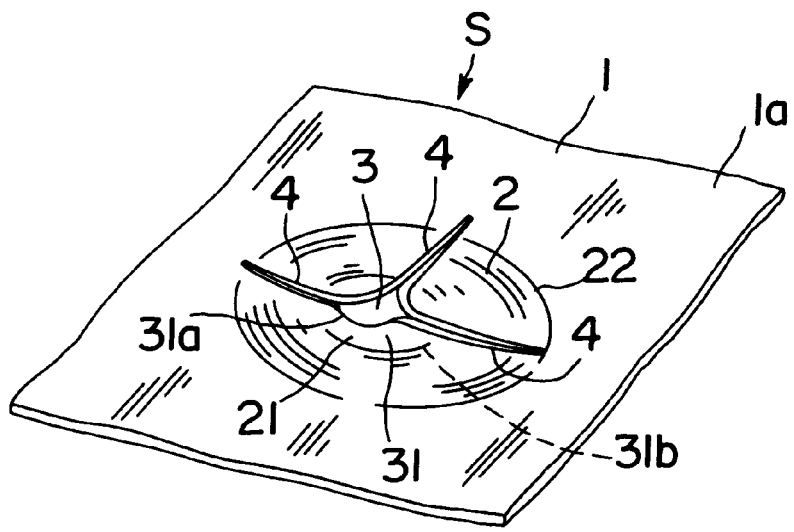
FIG. 2 is a perspective view enlarging a bowl-like projection of the plate-like current collector of this invention.

As shown in FIGS. 1 and 2, a plate-like current collector S of this invention, a number of bowl-like projections 2 are formed with a metal foil 1 wholly in such a state that the projections are concaved from the front side to the reverse side in a shape of a bowl. A center of a bottom portion 21 of the bowl-like projection 2 is punched to form a penetrated hole 3, which penetrates the front and reverse sides, and the bottom portion 21 of the bowl-like projection 2 is made to project upwards in such a hight that the penetrated hole 3 is positioned lower than an opening end 22 of the bowl-like projection 2, so as to form the periphery of the penetrated hole 3 to be a turning peripheral portion 31.

By the way, as the metal foil 1, it is usuable as those which may be used conventionally for the plate-like current collector, and not limited particularly. It may list up such materials, for example, a copper foil, a copper alloy foil, an aluminium foil, an aluminium alloy foil, a tin foil, a zinc foil, a zinc alloy foil, a nickel foil, a nickel alloy foil, an iron foil, an iron alloy foil, a stainless steel foil, a tin alloy foil, a solder foil, a foil consisting of a lead and a lead alloy, and a foil consisting of a tin and a tin alloy. It is preferable to choose an aluminium foil and an aluminium alloy foil for an anode plate of the plate-like current collector and as a cathode plate, it is preferable to use a copper foil and a copper alloy foil. As the copper foil, it may use either an electrolyte copper foil or a rolled copper foil. As the thickness of the metal foil 1, it is preferable to set a range of 5~100 μm, since where it is thin, a mechanial strength becomes low as the electrode plate current collector, and since where it is thick, a volume energy density and a weight energy density becomes low.

The bowl-like projection 2, which forms a circle in plan view, is formed normally in a pattern of a cross-stitch, namely making checkers leaving an equal distance in vertical and lateral directions, and the bowl-like projection is, of course, formed at a cross portion which is formed by diagonal lines of a square which is formed by the bowl-like projections 2 which are adjacent to one another.

Figure 3:
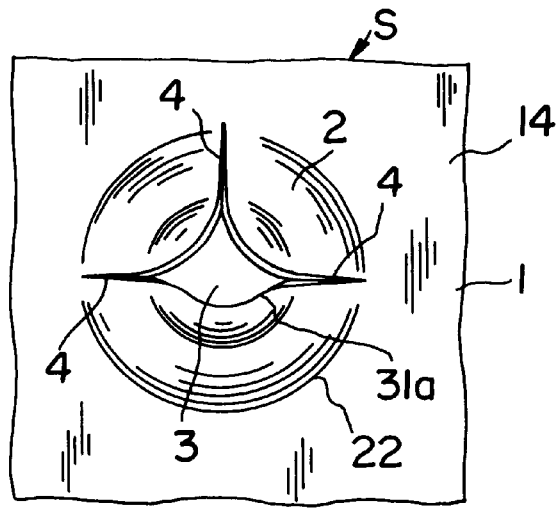
FIG. 3 is a plan view enlarging the bowl-like projection of the plate-like current collector of this invention.

As referred to hereinafter, by thrusting the punching pins into the metal foil 1 from the front side thereof to the reverse side and by utilizing the thrusting force, the bowl-like projection 2 is formed to project towards the reverse side of the metal foil from the front side (See FIGS. 2 and 3). Where the area of the opening peripheral portion of the bowl-like projection is small, it is difficult to obtain an advantage of forming the bowl-like projection, but where the area is large, it sometimes happens to deform the bowl-like projection 2 in the process of coating the mixed slurry since a mechanical strength of the bowl-like projection 2 becomes low, and therefore, it is preferable to determine its range within 0.005~10 mm$^2$, and more preferablly within a range of 0.1~1 mm$^2$.

At a center portion of the bottom of the bowl-like portion 2, a penetrated hole 3 is punched to penetrate front and reverse sides of the metal foil 1 by means of thrust of the punching pin, and the bottom portion 21 of the bowl-like projection 2 is formed to project topwards the front side thereof with a frictional force, which is generated at the time of withdrawal of the punching pin, between the peripheral surface of the punching pin and the sectional portion of the metal foil in which the punching pin penetrates. An elastic turning peripheral portion 31, which inclinedly turns inwards and upwards, is formed with the peripheral portion of the penetrated hole which is punched at a center portion of the bowl-like projection 2. It is preferable to adjust the hight of the top portion (the peripheral lower edge 31b of the elastic turning peripheral portion 31) of the bottom 21 of the bowl-like projection 2 with respecto to a flat surface 1a of the metal foil 1, within a range of 2~30 μm. Further, where the hight of the elastic turning peripheral portion 31 is low, the elasticity of the elastic turning peripheral portion 31 goes down, so that it is difficult to smoothly carry out inclination of the elastic turning peripheral portion 31 with the coating pressure of the mixed slurry and further the mixed slurry coated with a side of the plate-like current collector may sometimes go into the other side through the penetrated hole. Contrary to this, where the hight of the elastic turning peripheral portion is high, it sometimes happens that the mixed slurry, which is coated with the other side of the metal foil 1, cannot reach the layer of the active material B, which is already laminated over all, and therefore it is preferable to determine the hight within a range of 2~30 μm.

As will be described hereinafter, according to its necessity, the bowl-like projection 2 is further pressed from both sides thereof to adjust the upward projection of bottom portion 21 to have a size which is shallower than a depth of the bowl-like projection.

In other wards, it is adjusted that the upper edge 31a of the elastic turning peripheral portion 31, which is formed at the periphery of the penetrated hole 3, is positioned beneath the upper end opening edge 22 of the bowl-like projection.

Further, slits 4 are formed with both sides and a rear half portion of the bowl-like projection 2 to reach the opening edge 22 of the bowl-like projection from the penetrated hole 3, and then the bowl-like projection 2 including elastic turning peripheral portion 31 is cut and divided into three portions.

With the plate-like current collector S, it is described about such a case that its bowl-like projection 2 is formed to project from the front side of the metal foil 1 to the reverse side thereof. However, it is possible to mix or combine one in which the bowl-like projection 2 projects from the front side of the metal foil 1 to the reverse side thereof, and another in which the bowl-like projection projects from the reverse side of the metal foil to the front side thereof.

Next, an example of a method of producing the plate-like current collector S, will be described with reference to the drawings.

Figure 4:
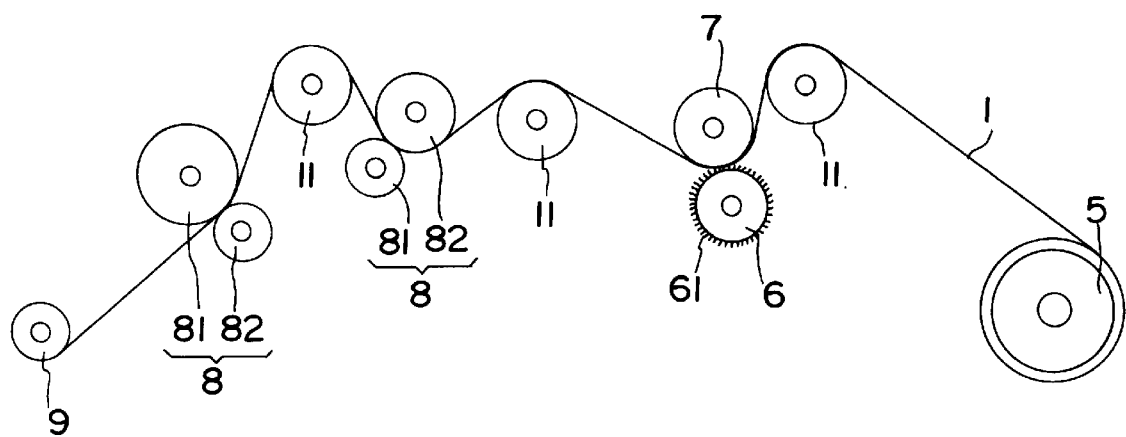
FIG. 4 is a typical side view of an apparatus of producing the plate-like current collector of this invention.

As shown in FIG. 4, an apparatus used for carrying out the method of punching the metal foil, comprises a re-winding roll for re-winding a metal foil 1, a pin roll 6, a backup roll 7 contacting with the pin roll 6 under pressure, a press roll 8 consisting of two rolls 81 and 82, and a winding roll 9 for winding the punched metal foil. The numeral 11 is a guide roll which is arranged suitably according to its necessity.

Figure 5:
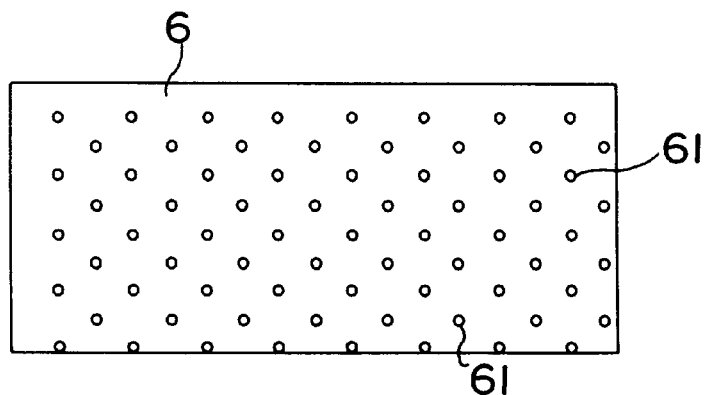
FIG. 5 is a plan view of a pin roll.

The re-winding roll 5 is wound with a long and belt-like metal foil 1 which has not yet been punched but has a smooth surface and a predetermined width. The outer diameter of the pin roll 6 is set normally to be about 100~300 mm, and punching pins 61 are provided with the periphery of the pin roll to stand in a vertical direction with respect to the periphery. The standing pattern of the punching pins 61 and its arranging density may be adjusted suitably according to a punching pattern of the penetrated holes of the metal foil. For example, as shown in FIG. 5, it may be selected such a pattern that the punching pins 61 are provided with the punching roll 6 leaving an equal distance among them in vertical and lateral directions and further the punching pin 61 is positioned at a cross portion which is defined by diagonal lines of a square which is formed by punching pins 61 adjacent to one another. Where the punching pins 61 are arranged in a cross stitch, its arranging density of the punching pins 61, which are adjacent to one another in vertical and lateral directions, may be adjusted to have a distance of 2~5 mm therebetween.

Figure 6A:
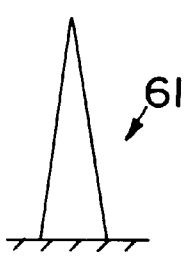
FIG. 6 is a perspective view showing punching pins provided with the periphery of the pin roll.
Figure 6B:
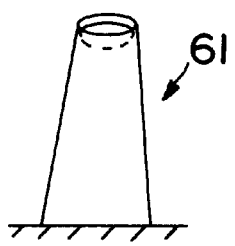
Figure 6C:
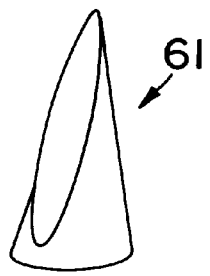

As the shape of the punching pin 21, as shown in FIG. 6(a), it may use a conical form having a tip at the top thereof and a diameter of the base is 20~500 μm and the hight is 0.3~2 m. As the shape of the punching pin 61, it is acceptable to use such a shape which may punch the metal foil 1 to form the penetrated hole 3. For example, as shown in FIG. 6(b), it is acceptable to use one that a low wall facing upwards is provided with the upper edge of a truncated cone and then a tip portion is formed with the upper end of the low wall. Further, as it is shown in FIG. 6(c), it is, of course, acceptable to use one that the periphery of a cone is cut off inclinedly from the tip portion of the cone to the base portion thereof and its out edge of the section is sharpened.

The outer diameter of the backup roll 7, is set to be normally about 100~300 mm, and its periphery is formed to receive the punching pins 61 which penetrate the metal foil 1 towards the reverse side thereof. In practical, the backup roll 7, itself is made of a material having elasticity such as a rubber. However, it is acceptable to form the backup roll 7 which is improved to have a stability in rotation by using a hard material as its central portion or a core and it may laminate a material having elasticity such as a rubber on the periphery thereof to from layers.

The press roll 8 comprises a pair of rolls 81 and 82. The roll 81 is formed by a hard material such as iron and on the other hand, the roll 82 is formed by a rubber. Further, these rolls 81 and 82 are formed to be smooth with their peripheral surfaces, and therefore, the metal foil 1 may be pressed strongly and surely from both sides by the faced pressing surfaces of the iron roll 81 and the rubber roll 82, while the rubber roll 82 absorbs a luck of uniformity of thickness of the metal foil 1. It is acceptable to form the roll 81 with a rubber and on the other hand the roll may be formed with a hard material such as iron.

Next, it will be explained about a method of producing the metal foil which is punched to have a number of penetrated holes of small diameter by means of the above-mentioned apparatus. First, the metal foil 1 of long and belt-like form, which is wound on the rewind roll 5, is withdrawn continuously and the metal foil 1 is supplied to between the pin roll 6, which is arranged forwardly, and the backup roll 6 which contacts the pin roll under pressure.

Then, the metal foil 1 is pressed from the both sides thereof by means of the facing peripheral surfaces of the pin roll 6 and the backup roll 7, which are arranged to contact to each other under pressure and the punching pins 61 penetrate the front side of the metal foil 1. Accordingly, the punching pins 61, which are provided with the periphery of the pin roll 6, may penetrate the metal foil A with their bottom portions, and with the penetrating force of the punching pins 61, where the punching pins penetrate, may project from the front side of the metal foil to the reverse side thereof so as to for a bowl-like projection 2 having a circle in plan view. With the penetrating force by means of the punching pin 61 against the metal foil 1, the peripheral portion of the penetrated hole may be torn so as to form plural slits 4 which extend radially towards the upper opening edge 22 of the bowl-like projection 2.

Thereafter, the metal foil 1, which is punched by the punching pins 61 with their bottom portions, is transferred forwardly and according to its transfer, as the punching pins 61 are withdrawn from the metal foil 1, the ring portion of the bottom 21 of the bowl-like projection is drawn in a direction of withdrawal of the punching pin 61 due to the frictional force caused between the periphery of the punching pin 61 and the section of the metal foil 1 where the punching pin penetrates.

Therefore, while the bottom 21 of the bowl-like portion 2 is projecting towards the front side of the metal foil, the punching pin 61 is withdrawn from the metal foil 1 and an elastic turning peripheral portion 31 is formed with the periphery of a penetrated hole 31 formed by the punching pin 61 to stand upwards.

Next, in order to adjust the upper edge 31a of the elastic turning peripheral portion 31 of the penetrated hole 3, which is formed in the interior of the bowl-like projection 2 of the metal foil 1 having a number of the bowl-like projections, to locate beneath the opening edge 22 of the bowl-like projection 2, the metal foil 1 is supplied to the press roll 8 (between the roll 81 and the roll 82), which is arranged forwardly, via the guide roll 11.

The metal foil 1 supplied between the press roll 8 (between the roll 81 and the roll 82), is pressed from both sides with the faced peripheral surfaces of rolls 81 and 82, and then the projecting end portion of the upper end portion of the elastic turning peripheral portion 31, which projects upwardly of the upper opening edge 22 of the bowl-like projection, is pressed in the bowl-like projection 2 so as to adjust the upper edge 31a of the elastic turning peripheral portion 31 to be positioned beneath the upper opening edge 22 of the bowl-like projection 2, so that a degree of upward projection of the bottom 21 of the bowl-like projection 2 becomes to have a size shallower than a depth of the bowl-like projection 2.

Thus, after the metal foil 1 having a number of bowl-like projections 2, is transferred from the press roll 8, it is supplied to and pressed by the press roll 8 again in order to surely adjust the degree of upward projection of the bottom 21 of the bowl-like projection 2 to have a size shallower than a depth of the bowl-like projection 2. Then, the metal foil 1 formed with a number of bowl-like projections 2 with its entire area, is wound by the winding roll 9.

In the above-mentioned method of the plate-like current collector, when the metal foil 1 is punched by means of the punching pins 61 of the pin roll 6 to form the penetrated holes, it sometimes happens to produce particle dust of the metal foil 1. Where the surface of the current collector S with particle dust, is coated and laminated with an active material, not only the thickness of the active material becomes uneven, but also it is very dangerous since it has a possiblity to cause a short circuit between the anode and the cathode when a secondary battery is produced. Then, it is preferable to remove the particle dust left on the metal foil 1, and as the removing means, it may list up such means for blowing the particle dust by means of a blower or sucking the particle dust.

Figure 7:
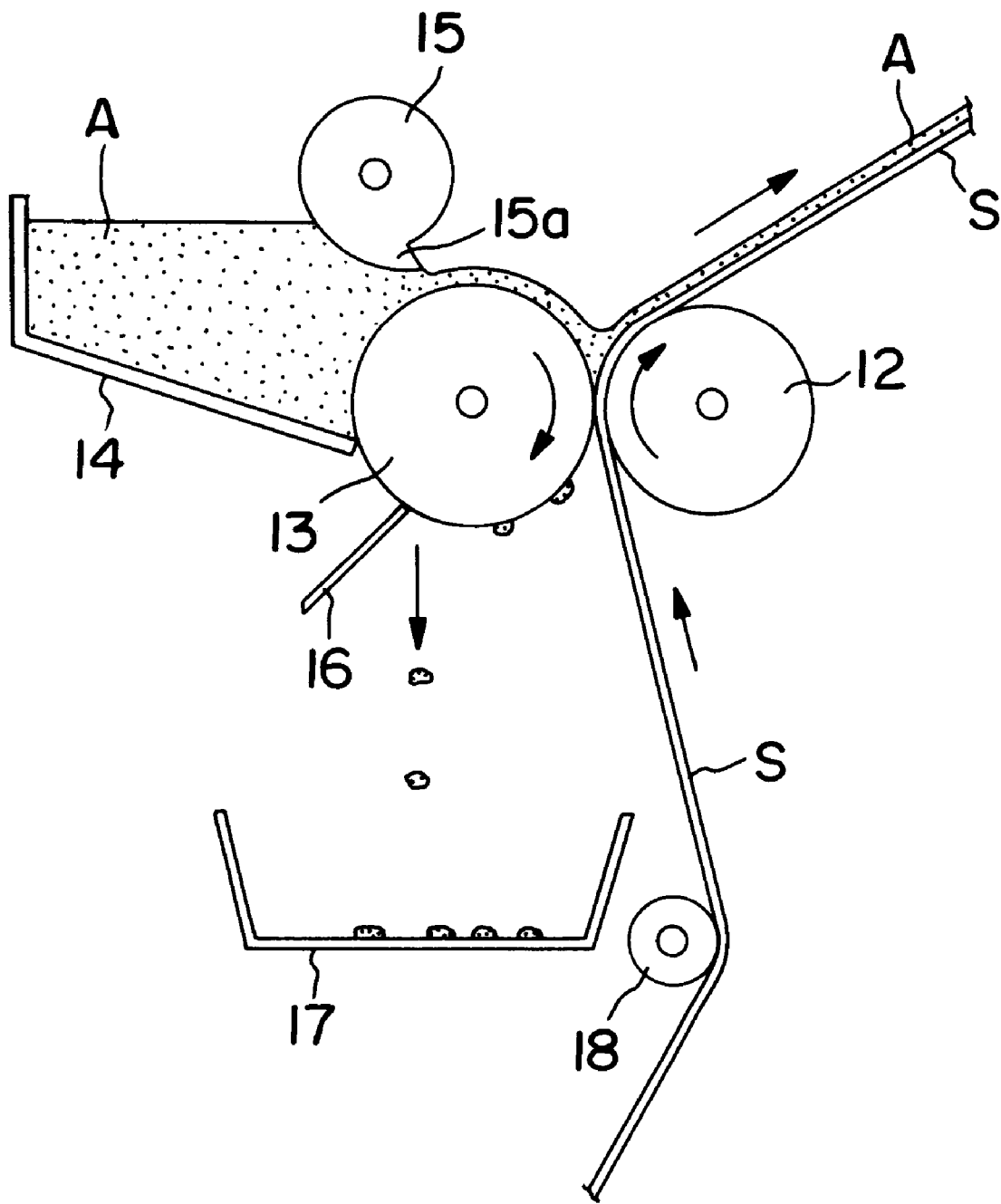
FIG. 7 is a typical side view showing a state that a side surface of the plate-like current collector is coated with a mixed slurry by means of an apparatus for coating the plate-like current collector with the mixed slurry.

Next, it will explain about a method of producing an electrode plate by laminating the active material on the front and reverse sides of the plate-like current collector which is produced in the above-mentioned manner, with reference to the drawings. An apparatus of producing the pole plate by using the plate-like current collector S, as shown in FIG. 7, comprises transfer roll 12 and coating roll 13 which are contacting each other, a supplyer 14 disposed behind the coating roll 13 and pooling a mixed slurry A including an active material and a binder and supplying the mixed slurry A to the coating roll 13, a comma 15 for adjusting a coating thickness of the mixed slurry with respect to the coating roll 13, a cleaning doctor 16 for removing the mixed slurry A adhered to the periphery of the coating roll 13 after coating the plate-like current collector S with the mixed slurry A, a tray 17 for receiving the mixed slurry A removed by the cleaning doctor 16, and a guide roller 18 for supplying the plate-like current collector S between the transfer roll 12 and the coating roll 13.

The coating roll 13 is rotatable in a direction opposite to a transfer direction of the plate-like current collector S, and may coat the plate-like current collector S with the mixed slurry, which collector is supplied between the coating roll 13 and the transfer roll 12.

The supplyer 14 disposed behind the coating roll 13, is formed to be a tray and its front surface is formed with the periphery of the coating roll 13, and the mixed slurry A pooled in the supplyer 14 is contacted with the rear surface of the coating roll 13, so as to coat the periphery of the rear of the coating roll 13 with the mixed slurry.

The comma 15 is disposed to adjust a coating thickness of the mixed slurry A which is coated on the periphery of the coating roll 13 according to the manner as mentioned above. The comma 15 is adjusted in such a manner that a projecting member 15a in a shape of a bill is made to project from the under surface of a roll body and the lower end of the projecting member 15a is positioned above the periphery of the coating roll 13.

The excessive mixed slurry A of the mixed slurry coated with the periphery of the coating roll 13, is removed by means of the tip of the projecting member 15a of the comma 15 and then the mixed slurry A is supplied between the faced peripheral surfaces of the coating roll 13 and the transfer roll 12 in such a state that the periphery of the coating roll 13 is coated with the the mixed slurry in a constant thickness.

Figure 8A:
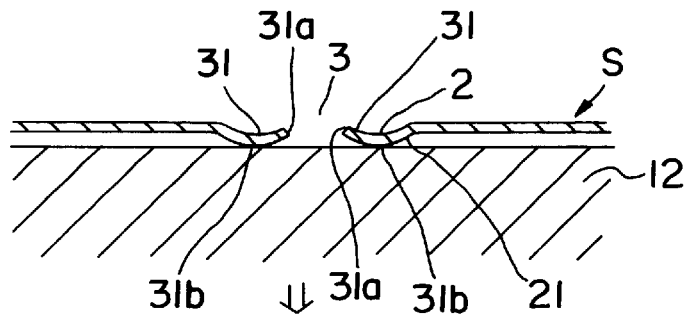
FIG. 8 is a sectional view showing processes for producing an electrode pate by coating both sides of the plate-like current collector with the mixed slurry from the front side to the reverse side in order.

When the plate-like current collector S is supplied between the coating roll 13 and the transfer roll 12, a side of the collector (the side facing the coating roll 13) is coated with the mixed slurry A, and the plate-like current collector S is transferred while its another side is contacting with the transfer roll 12. In this coating process, where the collector is supplied in a state that the reverse side of the collector is contacted with the transfer roll 13, it brings about such a state that the outer bottom surface 21 of the bowl-like projection 2 is contacted with the periphery of the transfer roll, as a result, the elastic turning peripheral portion 31 becmes in a standing state inclined inwardly with respect to the coating roller 13 (See FIG. 8(a)).

In this state, the surface of the plate-like current collectors is coated with the mixed slurry including an active material and a binder by means of the coating roll 13. At the time, the front side of the plate-like current collector S is pressed by the coating roll 13, and with the coating force by the coating roll 13, the elastic turning peripheral portion 31 is pressed to fall from the state that the turning peripheral portion is standing inwardly and inclinedly towards the coating roll 13, so that the elastic turning peripheral portion 31 elastically inclines in a direction to close the penetrated hole 3 with the lower end 31b of the turning peripheral portion 31 as a fulcrum and squeeze the opening of the penetrated hole 3. Further, the elastic turning peripheral portion 31 is divided into plural portions with the slits 4 so as to improve the degree of freedom and smoothly and ealstically incline.

Figure 8B:
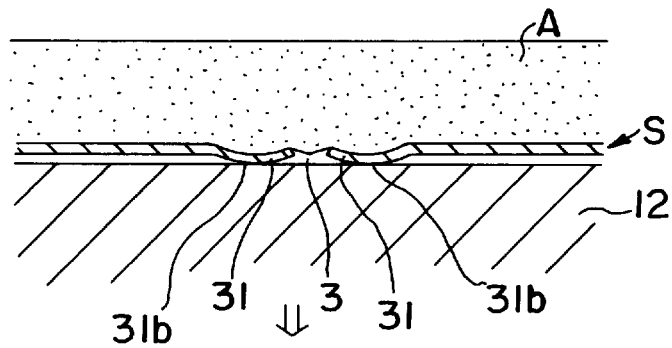

As mentioned above, when the front side of the plate-like current collector S is coated with the mixed slurry by means of the coating roll 13, the opening portion of the penetrated hole 3 is squeezed, the mixed slurry A coating the front side of the plate-like current collector never go into the reverse side thereof through the penetrated hole 3 (See FIG. 8(b)).

Figure 8C:
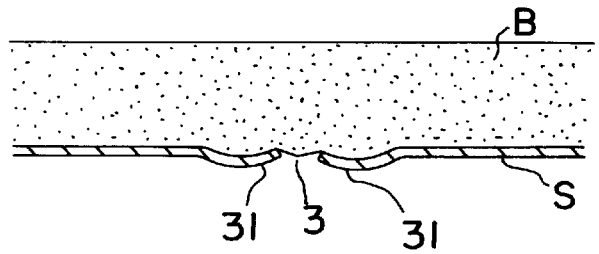

Then, when coating of the front side of the plate-like current collector S is finished, the plate-like current collector S is transferred from the faced surfaces of the coating roll 13 and the transfer roll 12, and a coating pressure against the plate-like current collector S due to the coating roll, is released (See FIG. 8(c)).

In this case, the elastic turning peripheral portion 31 elastically returns to its original state with the lower end edge 31b as a fulcrum to enlarge the opening of the penetrated hole. However, since the mixed slurry A has a dynamic viscosity of 2000~30000 cps, and since the coating pressure is not urged to the plate-like current collector S, the mixed slurry A never go into the reverse side of the plate-like current collector S through the penetrated hole 3.

Thereafter, the mixed slurry coating the surface of the plate-like current collector S is dried or hardened with ultraviolet rays, so as to laminate and integrate the active material with the plate-like current collector, and then wound on the winding roll.

The active material is also laminted on the reverse side of the plate-like current collector in the case of the electrode plate of a secondary battery, and therefore the reverse side of the plate-like current collector, the front side of which the active material B is laminated, is coated with the mixed slurry including the active material and the binder by using the same apparatus as mentioned above.

Figure 9:
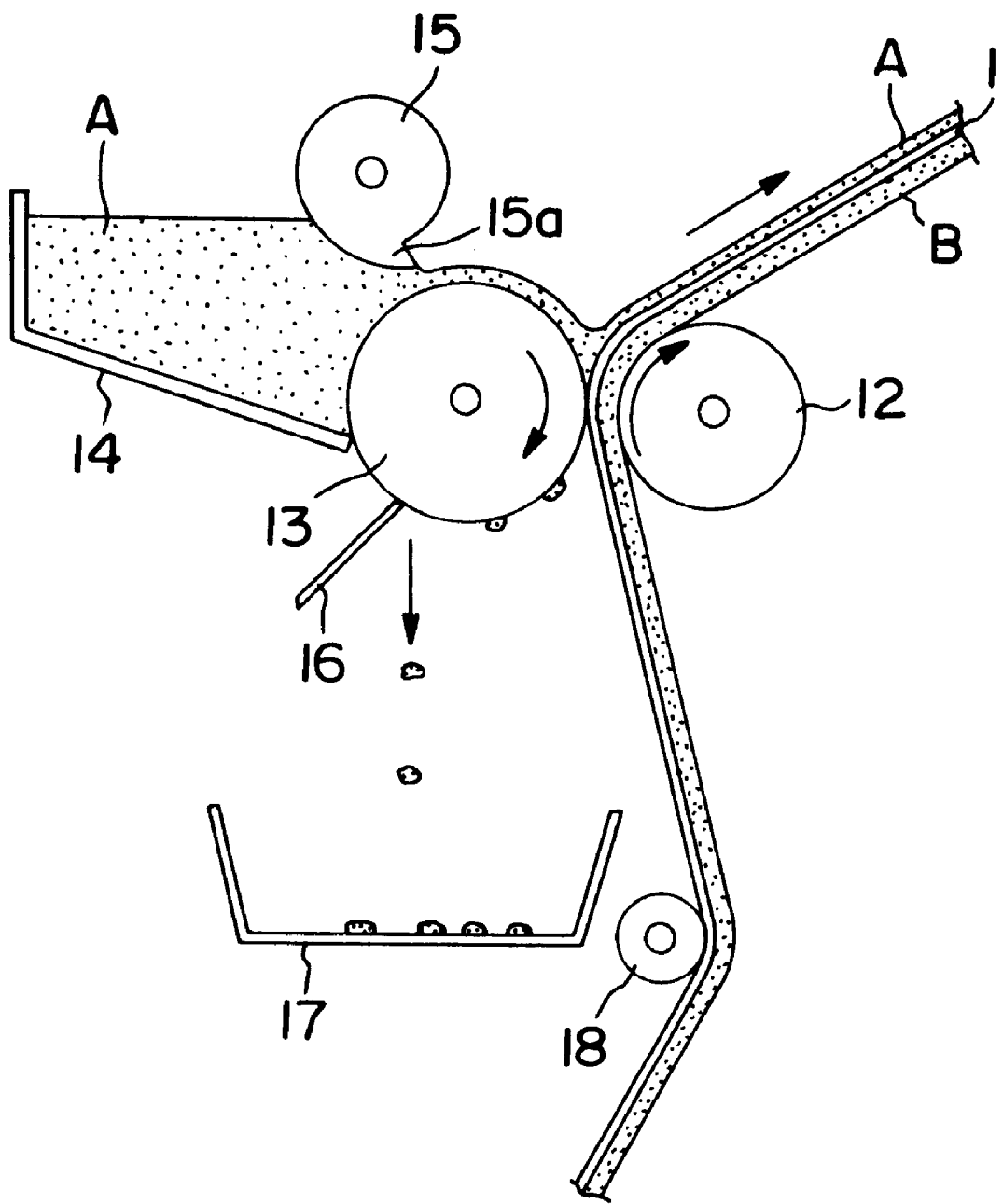
FIG. 9 is a typical side view showing a state that another side of the plate-like current collector to which an active material is laminated, is coated with the mixed slurry by means of an apparatus for coating the plate-like current collector with the mixed slurry.

Namely, as shown in FIG. 9, the plate-like current collector S is supplied between the coating roll 13 and the transfer roll 12 in such a state that the reverse side of the plate-like current collector S faces the coating roll 13, the layer of th active material B, which is laminated and integrated with the front side of the plate-like current collector S, becomes in a state of contacting the periphery of the the transfer roll 12 and on the other hand the reverse side of the plate-like current collector S faces the coating roll 13.

In this state, the reverse side of the plate-like current collector S is coated with the mixed slurry A including the active material and the binder by means of the coating roll 13. At the time, since the front side of the plate-like current collector S is received entirely by the layer of the active material B, when a coating pressure is added, the elastic turning peripheral portion 31 dones not inclined inwardly and as the result the opening portion of the penetrated hole 3 maintains its enlarged opening state.

Figure 8D:
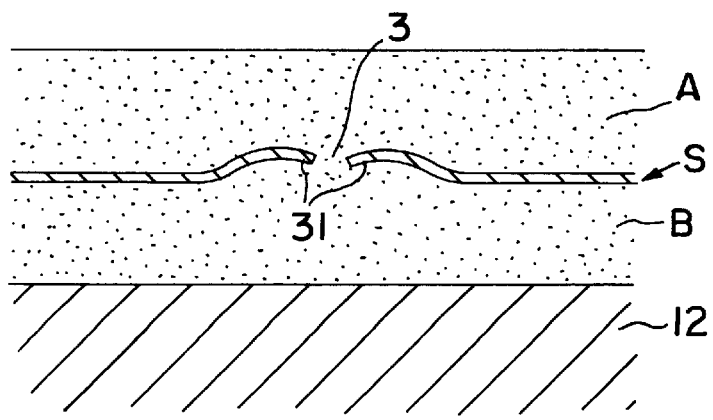

Therefore, the mixed slurry A coating the reverse side of the plate-like current collector S, is coating the reverse side of the plate-like current collector S entirely and it may go into the front side of the plate-like current collector S through the the penetrated hole 3 which is keeping its enlarged opening, and then connect with the layer of the active material B so as to be integrated therewith (See FIG. 8(d)). In addition, by drying or hardening with ultraviolet rays the mixed slurry laminated on the reverse side of the plate-like current collector S, it becomes possible to obtain the electrode plate in which the layer of the active material B is laminated and integrated with the front and reverse sides of the plate-like current collector S.

In the above, it is explained about a case that the layer of the active material B is first laminated on the front surface of the plate-like current collector, and then the layer of the active material B is laminated on the reverse side thereof in order to produce the electrode plate. However, the coating order of the mixed slurry is not limited particularly and it is possible that first the layer of the active material B is laminated on the reverse side of the plate-like current collector S, and then the front side thereof is laminated with the layer of the active material B. The process of these steps will be described as follows.

Figure 10A:
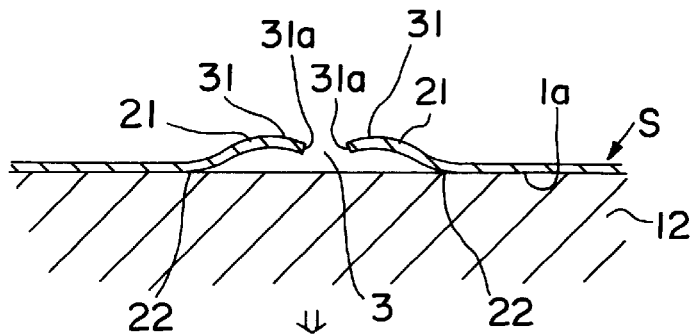
FIG. 10 is a sectional view showing processes for producing the electrode plate by coating both sides of the plate-like collector from the reverse side to the front side thereof in order.

By using the appratus of FIG. 7 and the same manner, the plate-like current collector S is supplied between the coating roll 13 and the transfer roll 12 in such a state that the reverse side of the plate-like current collector faces the coating roll 13. Then, the plate-like current collector S becomes in a state that the top of the outer bottom surface 21 of the bowl-like projection 2 faces the coating roll 13 while the flat surface 1a of the plate-like current collector is contacting with the periperhy of the transfer roll 12 (See FIG. 10(a)). The elastic turning peripheral portion 31 in the penetrated hole 3 of the bowl-like projection 2 becomes in a state of inclining inwardly with respect to the front side thereof and the tip of the elastic turning peripheral portion 31 becomes in a state of leaveing a predetermined distance from the periphery of the transfer roll 12.

Figure 10B:
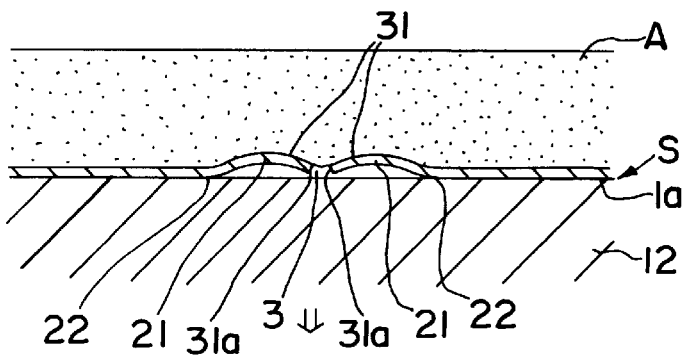

In this state, the mixed slurry A including an active material and a binder is coated with the reverse side of the plate-like current collector S by means of the coating roll 13. The plate-like current collector S is pressed with its reverse side in the direction from the reverse side to the front side by means of the coating roll 13 while the front side is supported by the transfer roll 12. With the coating force by the coating roll 13, the bowl-like projection 2 is pressed from the reverse side to the front side and since a clearance is formed between a tip edge 31a of the elastic turning peripheral portion 31 and the peripheral surface of the transfer roll 12, the bowl-like projection 2 may easily bend and deformed elastically and smoothly form the reverse side to the front side with the circular opening edge 22 as a fulcrum. According to this deformation of the bowl-like projection 2, the elastic turning peripheral portion 31, which is formed with the periphery of the penetrated hole 3 punched in the bowl-like projection, may deform from the outside to the inside, namely in a direction to close the penetrated hole 3, and as a result, the opening portion of the penetrated hole 3 is squeezed (FIG. 10(b)).

Further, the bowl-like projection 2 may be smoothly and elastically bent since it is divided into plural portions so as to increase the degree of freedom.

As mentioned above, when the mixed slurry A is coating on the reverse side of the plate-like current collector S by means of the coating roll 13, since the opening portion of the penetrated hole 3 is squeezed, the mixed slurry coating the reverse side of the plate-like current collector S never go into the front side thereof through the piercing hole 3.

When the coating of the mixed slurry A to the reverse side of the plate-like current collector S is finished, the plate-like current collector S is transferred from the faced surfaces of the coating roll 13 and the transfer roll 12 and as the result a coating force against the plate-like current collector S is released.

Figure 10C:
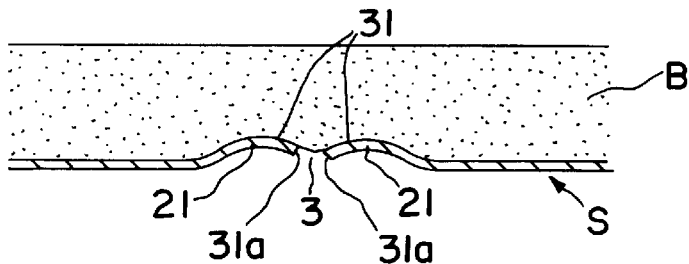

In this case, the bowl-like-projection 2 returns its original position elastically to enlarge the piercing hole with the circular opening endge 22 as a fulcrum, but since the mixed slurry A is high viscosity, particularly its dynamic viscosity is about 2000~30000 cps and since the coating pressure is not urged to the plate-like current collector S by the coating roll 13, the mixed slurry A never go into the front side of the plate-like current collector S through the penetrated hole 3 (See FIG. 10(c)).

Thereafter, the mixed slurry coating the reverse side of the plate-like current collector S is dried or hardened with ultraviolet rays, so as to laminate and integrate the active material with the reverse side of the plate-like current collector, and then wound on the winding roll.

In addition, it will be explained about processes for laminating and integrating the active material with the front side of the plate-like current collector S the reverse side of which the layer of the active material B is laminated. As mentioned above, the plate-like current collecor the reverse side of which the active material is laminated and integrated, is supplied between the coating roll 13 and the transfer roll 12 in such a state that the layer of the active material B faces the transfer roll 12, as shown in FIG. 9.

Then, the layer of the active material B laminated on the reverse side of the plate-like current collector S, becomes in a state of contacting with the periphery of the transfer roll 12 and the reverse side of the plate-like current collector S is supported by the layer of the active material B entirely.

In this state, the mixed slurry A including an active material and a binder is coated with the front side of the plate-like current collector S by means of the coating roll 13. At the time, since the reverse side of the plate-like current collector S is received entirely by the layer of the active material B, where a coating force is added, the bowl-like projection 2 does not bend and therefore the opening portion of the penetrated hole 3 maintains its enlarged opening state.

Figure 10D:
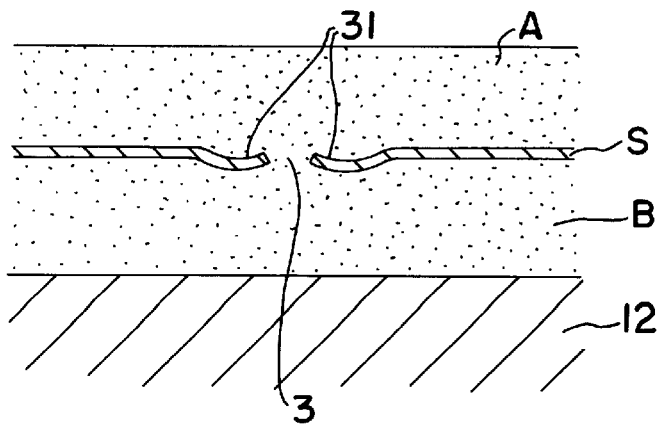

Accordingly, the mixed slurry A coating the front side of the plate-like current collector S may be coated with the entire front side of the plate-like current collector S and may go into the reverse side of the plate-like current collector S through the penetrated hole 3 which is keeping its opening state, so as to connect the layer of the active material B, which is laminated on the reverse side, and integrate therewith (See FIG. 10(d)).

Then, the mixed slurry A is dried or hardened with ultraviolet rays in the same manner of above, so that the electrode plate can be produced by laminating and connecting the active material layer B with the front side of the plate-like current collector S.

What is claimed is:

1. A plate-like current collector comprising;
   a metal foil having a plurality of bowl-like projections; each projection projecting downwardly from the front side thereof to the reverse side thereof and having a penetrated hole in the center of the projection, and
   a turning peripheral portion of the central penetrated hole formed to curve upwardly to a level positioning beneath the front side of the metal foil,
   wherein the penetrated hole may be enlarged or contracted using the elastic deformation of the turning peripheral portion.

2. The plate-like current collector as claimed in claim 1, wherein the turning peripheral portion is divided by slits formed radially from the penetrated hole to make a plurality of turning peripheral lips which may be deformed elastically in up and down directions.

3. A method of producing a plate-like current collector comprising the steps of;

supplying continuously a long belt-like metal foil between a pin roll, the periphery of which a plurality of punching pins are provided, and a back-up roll contacting the pin roll under pressure, forming a plurality of penetrated holes by means of the punching pins of the pin roll with the metal foil, and bowl-like projections; the peripheray of each bowl-like projection being projected downwardly, and forming a turning peripheral portion formed to make the peripheral portion of each of the penetrated holes to project upwardly at the time of withdrawal of the punching pins.

4. A method of producing a plate-like current collector comprising the steps of;

supplying continuously a long belt-like metal foil between a pin roll, the periphery of which a plurality of punching pins are provided, and a back-up roll contacting the pin roll under pressure, forming a plurality of penetrated holes by means of the punching pins of the pin roll with the metal foil, and bowl-like projections; the peripheray of each bowl-like projection being projected downwardly, forming a turning peripheral portion formed to make the peripheral portion of each of the penetrated holes to project upwardly at the time of withdrawal of the punching pins, and then supplying the punched metal foil to press roll means, which are positioned forwardly of said steps, and pressing the metal foil from both sides thereof so as to correct each of upper ends of the turning peripheral portion of the penetrated hole to be positioned beneath an opening or hole end of the bowl-like projection.

\* \* \* \* \*